UNITED STATES PATENT OFFICE.

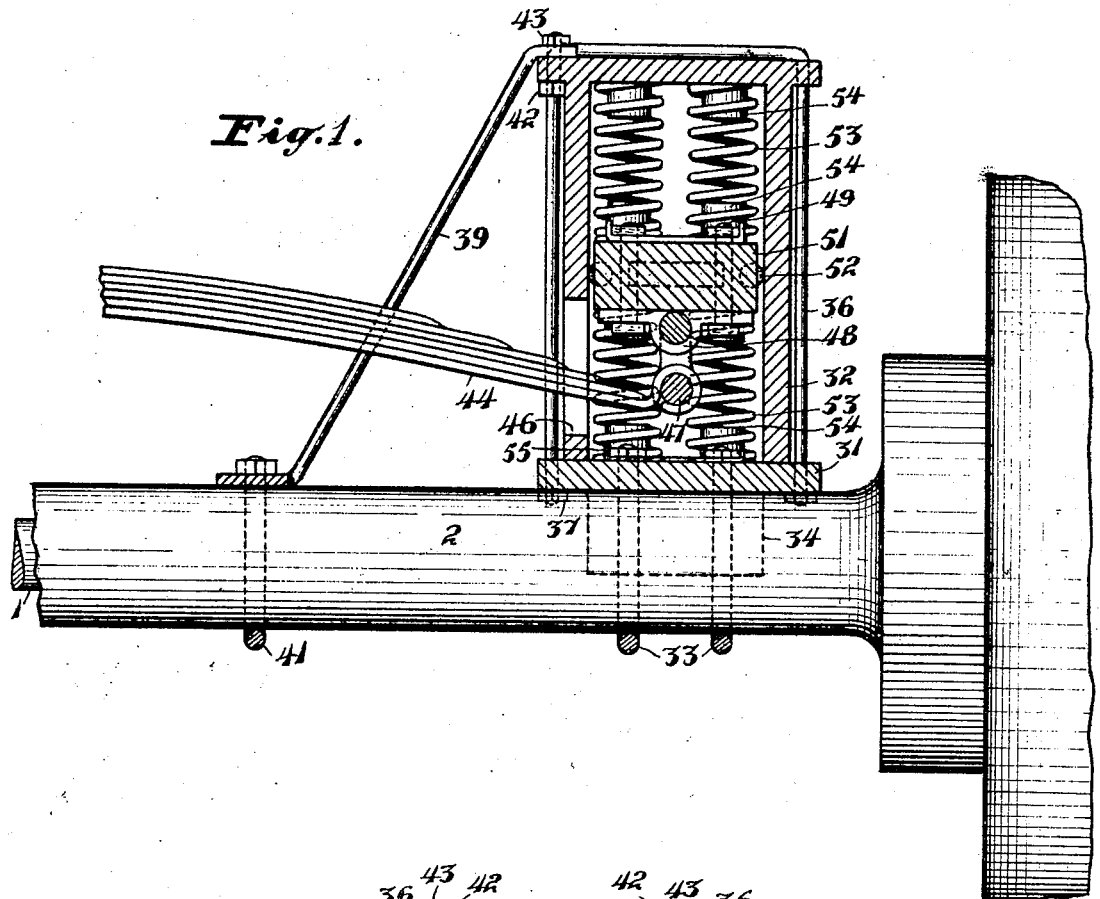
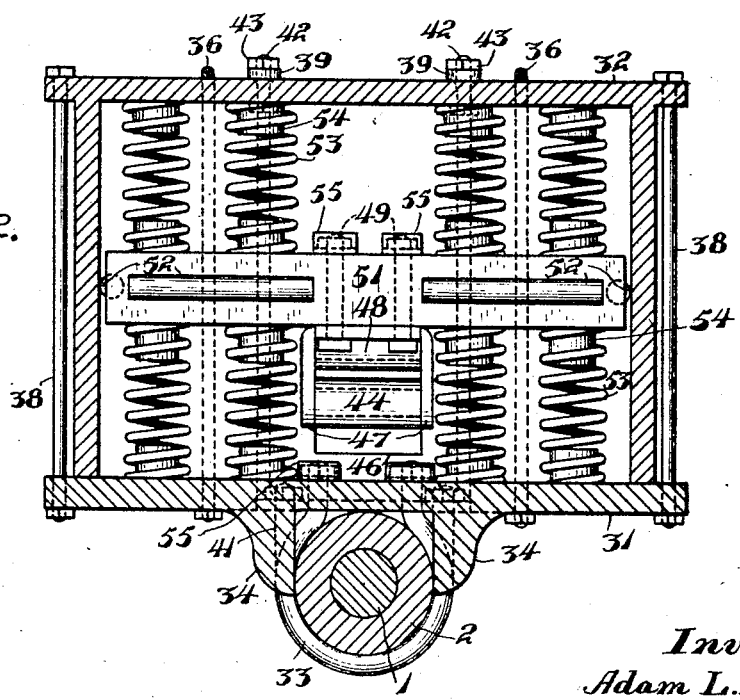

ADAM L. L. NEUMANN, OF OCCIDENTAL, CALIFORNIA.

RESILIENT SUPPORT FOR VEHICLES.

1,199,202.  Specification of Letters Patent.  Patented Sept. 26, 1916.

Application filed February 9, 1916. Serial No. 77,330.

*To all whom it may concern:*

Be it known that I, ADAM L. L. NEUMANN, a citizen of the United States, residing at Occidental, in the county of Sonoma and State of California, have invented new and useful Improvements in Resilient Supports for Vehicles, of which the following is a specification.

The object of the present invention is to provide resilient supports for vehicles upon the wheel axles which will absorb shocks when riding over inequalities in the roadway and greatly increase the comfort of the riders in the vehicle, and will also avoid the necessity of employing pneumatic tires for the wheels of the vehicle.

In the accompanying drawings, Figure 1 is a broken front view of my improved resilient support, part thereof being shown in vertical section; Fig. 2 is a transverse vertical sectional view of the same.

Referring to the drawing, 1 indicates a rear vehicle axle, and 2 is a sleeve around the same. A bottom 31 of a box 32 is secured to the sleeve 2 by means of clevises 33, said bottom having downwardly extending portions 34 engaging opposite sides of said sleeve. Said portions 34 may be of any shape and may be any distance apart so as to fit any axle. Any suitable locking devices may be provided for the nuts of the clevises 33. Said box 32 is secured to the bottom by U-bolts 36 and nuts 37 and also by bolts 38. Said box is additionally secured to the sleeve by an obliquely extending yoke 39, the central portion of which is secured to the sleeve by a clevis 41, while the ends are secured to the top of the box by bolts 42 and nuts 43. An end of a carriage spring 44 passes through a slot 46 in a side of the box and is secured around one side of a link 47, the other side of which is supported by a bearing 48 secured by bolts 49 to the under side of a block 51, the sides of which have recesses to receive anti-friction devices, such as rollers 52, which contact with the inner surfaces of the sides of the box. However, the ends of the carriage spring 44 may be secured on the top of the block 51, if desired. Springs 53 are compressed between the block 51 and the top and bottom of the box respectively, said springs being retained in place by their ends surrounding bosses 54 extending from said blocks at top and bottom of the box. The nuts which secure the bolts connecting the upper and lower blocks 3 and 4 and also those which secure the bolts 49 are locked by locking devices 55.

By using a large number of springs great resiliency is provided without the necessity of using a pneumatic tire and thereby the inconvenience and discomfort of punctures and blow-outs are done away with.

I claim:—

1. In combination with a sleeve around an axle of a vehicle, a box secured thereto, a block in said box, upper and lower pairs of springs between the block and the upper and lower sides of the box, a vertical side of the box having an opening therethrough, and a carriage spring extending through said opening and supported by said block.

2. In combination with a sleeve around an axle of a vehicle, a box secured thereto, a block in said box, upper and lower pairs of springs between the block and the upper and lower sides of the box, a vertical side of the box having an opening therethrough, a loop suspended from said block, and a carriage spring extending through said opening and supported by said loop.

In testimony whereof I have hereunto set my hand in the presence of two subscribing witnesses.

ADAM L. L. NEUMANN.

Witnesses:
F. M. WRIGHT,
D. B. RICHARDS.